(12) United States Patent
Giffels et al.

(10) Patent No.: US 9,435,562 B2
(45) Date of Patent: Sep. 6, 2016

(54) ELECTRIC HEATING DEVICE FOR HEATING FLUIDS

(71) Applicant: BorgWarner BERU Systems GmbH, Ludwigsburg (DE)

(72) Inventors: Thomas Giffels, Stuttgart (DE); Helmut Mueller, Hessigheim (DE); Ralph Waechter, Pfinztal (DE); Michael Stoerzinger, Bretten (DE); Bernd Halbrock, Koenigsbach-Stein (DE); Alexander Dauth, Maulbronn (DE); Klaus Lehmann, Oberderdingen (DE)

(73) Assignee: BorgWarner Ludwigsburg GmbH, Ludwigsburg (DE)

( * ) Notice: Subject to any disclaimer, the term of this patent is extended or adjusted under 35 U.S.C. 154(b) by 248 days.

(21) Appl. No.: 13/962,436

(22) Filed: Aug. 8, 2013

(65) Prior Publication Data
US 2014/0050466 A1    Feb. 20, 2014

(30) Foreign Application Priority Data
Aug. 20, 2012 (DE) .................. 10 2012 107 600

(51) Int. Cl.
| F24H 1/10 | (2006.01) |
| H05B 3/78 | (2006.01) |
| F24H 9/00 | (2006.01) |
| F24H 1/00 | (2006.01) |
| B60H 1/22 | (2006.01) |
| H05B 3/22 | (2006.01) |
| H05B 3/42 | (2006.01) |

(52) U.S. Cl.
CPC ............ *F24H 1/103* (2013.01); *B60H 1/2221* (2013.01); *F24H 1/009* (2013.01); *F24H 1/102* (2013.01); *F24H 9/0015* (2013.01); *H05B 3/22* (2013.01); *H05B 3/42* (2013.01); *B60H 2001/2271* (2013.01); *F24H 2250/04* (2013.01); *H05B 2203/02* (2013.01); *H05B 2203/021* (2013.01)

(58) Field of Classification Search
None
See application file for complete search history.

(56) References Cited

U.S. PATENT DOCUMENTS

| 1,671,677 | A | * | 5/1928 | Keeton ........................ 392/489 |
| 2,775,683 | A | * | 12/1956 | Kleist .......................... 392/398 |
| 3,643,733 | A | * | 2/1972 | Hall et al. ...................... 165/81 |
| 4,147,927 | A | * | 4/1979 | Pirotte .................... A45D 1/28 219/241 |
| 4,465,922 | A | * | 8/1984 | Kolibas ........................ 392/484 |
| 4,480,172 | A | * | 10/1984 | Ciciliot et al. ................ 392/396 |
| 4,563,571 | A | * | 1/1986 | Koga et al. ................... 392/493 |

(Continued)

FOREIGN PATENT DOCUMENTS

| DE | 91 13 348 U1 | 1/1992 |
| DE | 197 37 694 C1 | 10/1998 |

(Continued)

*Primary Examiner* — Thor Campbell
(74) *Attorney, Agent, or Firm* — Bose McKinney & Evans LLP

(57) ABSTRACT

The invention relates to a electric heating device for heating fluids, comprising at least one heating resistor, a screw, which defines a helical flow channel, and a tube housing, which surrounds the screw. In accordance with this disclosure, the screw has a core in which the at least one heating resistor is arranged.

23 Claims, 2 Drawing Sheets

(56) References Cited

U.S. PATENT DOCUMENTS

| | | | |
|---|---|---|---|
| 4,822,980 A * | 4/1989 | Carbone | H05B 3/82 |
| | | | 219/205 |
| 4,835,370 A * | 5/1989 | Van Bokestal | H05B 3/14 |
| | | | 219/504 |
| 4,841,127 A * | 6/1989 | Prager | H05B 3/141 |
| | | | 132/232 |
| 4,975,559 A * | 12/1990 | Frisch | 392/449 |
| 5,194,717 A * | 3/1993 | Cowen | F04C 29/04 |
| | | | 219/201 |
| 6,459,854 B1 * | 10/2002 | Yoakim et al. | 392/479 |
| 6,847,017 B2 * | 1/2005 | Starck | H05B 3/14 |
| | | | 219/530 |
| 7,458,807 B2 * | 12/2008 | Alfoldi et al. | 431/11 |
| 7,486,877 B2 * | 2/2009 | Boussemart et al. | 392/485 |
| 7,756,404 B2 * | 7/2010 | Schubert et al. | 392/478 |
| 7,816,630 B2 * | 10/2010 | Hamburger | H05B 3/06 |
| | | | 219/202 |
| 7,977,610 B2 | 7/2011 | Hamburger et al. | |
| 8,170,406 B2 * | 5/2012 | Wu | B60S 1/487 |
| | | | 392/465 |
| 8,180,207 B2 * | 5/2012 | Shirai et al. | 392/491 |
| 8,731,386 B2 * | 5/2014 | Waechter et al. | 392/479 |

FOREIGN PATENT DOCUMENTS

| | | |
|---|---|---|
| DE | 10 2010 031 520 A1 | 1/2012 |
| EP | 0 104 673 A2 | 4/1984 |
| EP | 1 284 117 A1 | 2/2003 |
| EP | 1 467 599 A2 | 10/2004 |
| FR | 2 634 090 A1 | 1/1990 |

* cited by examiner

ELECTRIC HEATING DEVICE FOR HEATING FLUIDS

RELATED APPLICATIONS

This application claims priority to DE 10 2012 107 600.6, filed Aug. 20, 2012 which is hereby incorporated by reference in its entirety.

BACKGROUND

The invention relates to an electric heating device for heating fluids comprising a screw, which defines a helical flow channel. Heating devices of this type are required in vehicles, for example, in order to heat water.

SUMMARY

The present invention presents a way in which an electric heating device for heating fluids can be created, which cost-effectively meets the demands stipulated by vehicle manufacturers.

A heating device according to this disclosure has a helically wound flow channel. The flow channel is defined by a screw, which is arranged in a cylindrical tube housing. The flow channel thus runs in the flight of the screw and is defined radially outwardly by the tube housing. The flow channel thus has the shape of a helix.

The heating device contains one or more heating resistors. The heating resistor(s) is/are arranged in an interior of the screw's core and are thus protected against contact with the fluid to be heated. The interior runs in the longitudinal direction of the screw at a distance from the flow channel, that is to say in a core of the screw, around which the flight winds. Heat generated by the heating resistor is output via the screw to fluid flowing through the flow channel. The heating device thus operates as a tankless heater.

The helical flow channel leads the fluid to be heated a number of times around the center of the screw, in which the thermal heat is generated, and thus enables a long flow path of the fluid in combination with a low dynamic pressure in a compact heating device. The longer the flow path, the better the fluid absorbs heat.

In order to achieve a low flow resistance with high fluid throughput, the cross section of the flow channel can be enlarged accordingly. A large cross section of the flow channel has the disadvantage however of correspondingly smaller heat transfer areas. This disadvantage can be remedied by using a screw having two or more flights with separate flow channels running in parallel.

A heating device according to this disclosure has an advantageously simple structure and can be assembled by inserting the screw into the tube housing and by introducing one or more heating elements into the interior of the screw with little effort. Here, it is not absolutely necessary for the tube housing to bear against the screw in a sealing manner. If a proportion of the fluid to be heated does not follow the helical flow channel, but breaches the flanks of the screw thread in the form of a leakage flow, this is harmless, since the majority of the fluid in any case follows the flight, that is to say the helical flow channel, and can thus absorb heat over a relatively long path. In the case of production, relatively large manufacturing tolerances can therefore be accepted, which facilitates cost effective production.

In accordance with an advantageous refinement of this disclosure, the screw is produced from metal, for example, aluminium. Due to the good heat conductivity of metals, heat generated by the heating resistor can then be forwarded efficiently and output to fluid in the flow channel. The screw can be produced cost effectively as a cast part for example. A screw made of metal has a relatively large heat capacity. This is advantageous because heating power is often not available continuously in a vehicle. After the screw has been heated up, fluid running through can then still be heated even if the on-board power supply system cannot momentarily supply any heating power because more important consumers in the vehicle have to be operated preferentially.

In accordance with a further refinement of this disclosure, the tube housing is formed from plastic. Plastics have a relatively poor heat conductivity, and therefore heat losses to the surrounding environment can be kept low. In order to further improve the thermal insulation, the tube housing may have a multi-layered wall or a wall containing foam. The tube housing can also be fabricated here from metal, for example, steel, and may comprise a thermally insulating plastic casing.

In accordance with a further advantageous refinement of this disclosure, the tube housing is porous on its inner face. The heat transfer can thus be improved.

The interior of the screw can be shaped in a manner matching the heating resistors used or in a manner matching the shape of a heating rod. The interior may have a round cross section for example or a strip-shaped cross section.

In accordance with a further advantageous refinement of this disclosure, PTC elements are used as heating resistors, in particular ceramic PTC elements, for example based on barium titanate. PTC elements advantageously offer intrinsic protection against overheating. Resistance wire can also be used as a heating resistor, for example.

In accordance with a further advantageous refinement of this disclosure, a frame is arranged in the core of the screw and holds the at least one heating resistor. Such a frame can be fastened, for example, to a contact plate and may have receptacles for PTC elements, in particular in order to hold ceramic PTC elements in a clamped manner. Suitable frames are described, for example, in EP 1 467 599 A1 which is incorporated by reference.

BRIEF DESCRIPTION OF THE DRAWINGS

The above-mentioned aspects of exemplary embodiments will become more apparent and will be better understood by reference to the following description of the embodiments taken in conjunction with the accompanying drawings, wherein.

DETAILED DESCRIPTION

The embodiments described below are not intended to be exhaustive or to limit the invention to the precise forms disclosed in the following detailed description. Rather, the embodiments are chosen and described so that others skilled in the art may appreciate and understand the principles and practices taught herein.

Figure 1:
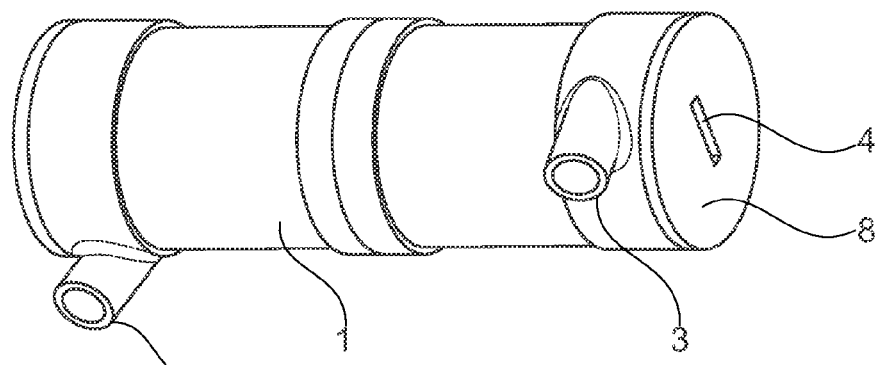
FIG. 1 shows an illustrative embodiment of a heating device according to this disclosure.
Figure 2:
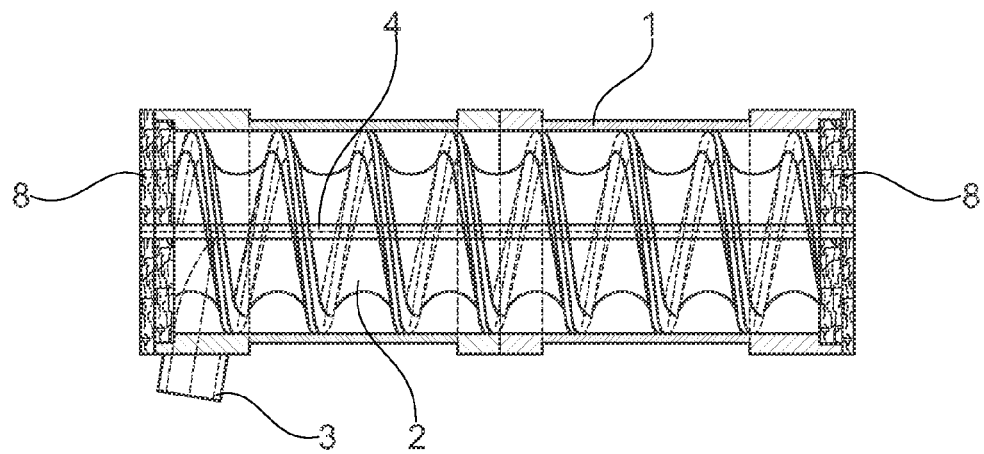
FIG. 2 shows a sectional view of FIG. 1.
Figure 3:
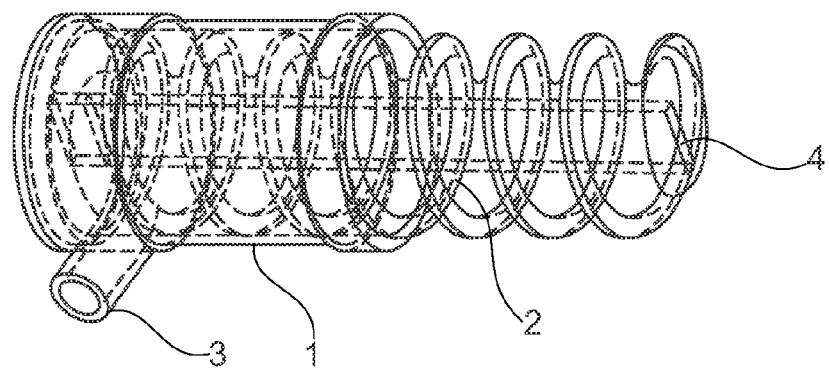
FIG. 3 shows the heating device with partially removed tube housing.

The heating device shown in FIGS. 1 to 3 is designed as a tankless heater. In a tube housing 1, a screw 2 is arranged, which defines a helical flow channel by means of its flight.

The screw 2 may have a single thread or several threads. The flow channel defined by the thread is accessed by openings in the lateral surface of the tube housing 1. These openings can be provided with connection pieces 3 and for example may also be arranged in an end face of the tube housing 1.

In the illustrative embodiment shown, the flow channel winds more than four times around the longitudinal axis of the screw 2, for example, seven times. Depending on the requirements of a given application, the flow channel may also wind more times around the longitudinal axis of the screw 2. A screw 2 that is formed by joining together a plurality of shorter screws can be used for this purpose.

The screw 2 has, in its center, a cavity 4, in which at least one heating resistor, preferably a plurality of heating resistors, are arranged. The cavity 4 extends in the longitudinal direction of the screw 2 and is arranged at a distance from the flow channel. The screw 2 therefore surrounds the cavity 4 over its entire length and encloses said interior over its entire periphery. The heating resistors arranged in the cavity 4 are therefore protected by the screw 2 against contact with the liquid to be heated. The cavity 4 preferably passes from one end of the screw 2 to the other end. The interior may also be formed as a blind bore, however.

Figure 4:
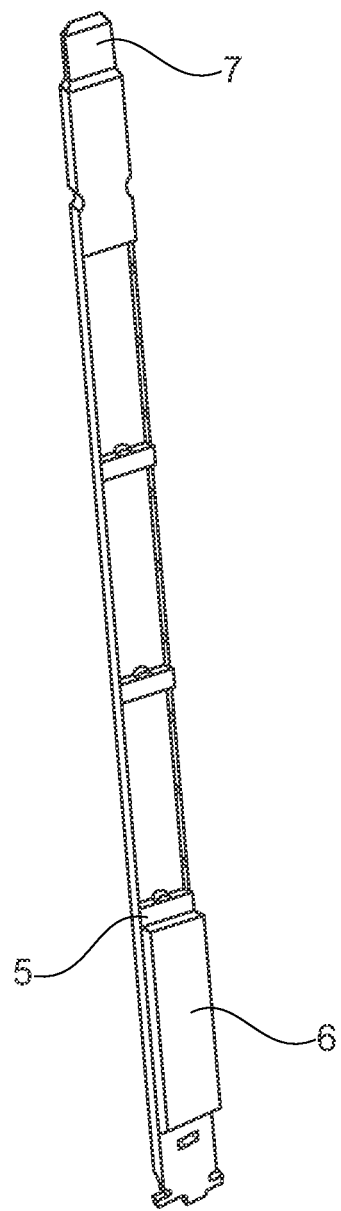
FIG. 4 shows a contact plate with a frame for PTC elements.

The heating resistors can be ceramic PTC elements for example. Heating resistors of this type can be held in the interior 4 by a frame. An embodiment of such a frame 5 is illustrated in FIG. 4. The frame 5 holds heating resistors 6 in a clamped manner in compartments provided for this purpose, for example by means of clamping lugs, and is fastened to a contact plate 7. The rear face of the contact plate 7 facing away from the heating resistors 6 is electrically insulated with respect to the screw 2 by an insulation layer. The heating resistors 6 can be electrically contacted on one side via the screw 2 and on the other side by a contact plate 7. It is also possible for the heating resistors 6 to be arranged between two contact plates 7, which may each carry a frame 5.

In order to improve the thermal coupling between the heating resistors 6 and the screw 2, a spring element, for example a leaf spring, can be arranged on one side of the heating resistors 6. Such a spring element can be arranged between the rear face of the contact plate or the rear face of one of the contact plates and a wall of the interior 4 in order to press heating resistors 6 or one of the two contact plates against the opposite wall of the interior 4. Alternatively or additionally, the interior 4 can also be filled with a filler, for example a powder, a paste or a casting compound, which is poured in the liquid state into the interior and later solidifies.

The heating resistors 6 can be part of a heating rod that is arranged in the interior 4. Such a heating rod may have its own tube housing. A plurality of heating resistors 6 can also be connected however by a frame 5 to form a heating rod, which can then be fitted into the interior 4.

Resistance wire can also be used as a heating element. The resistance wire for example can be wound in the form of an external conductor to form a double helix, and can thus fit resiliently in the central passage of the screw. The heating element may also be a helixed resistor however, which is packed tightly in a heating rod.

The heating rod is inserted into the screw 2, for example by being pressed in, so as to be effectively heat conductive.

The screw 2 can be made of metal, for example, aluminium. The screw 2 may be cast or produced by milling for example. The surface of the screw may be roughened in its flight in order to increase the heat output area. The heat output area can also be increased for example by heat output elements, for example, ribs or other protrusions, arranged in the flow channel.

Any ribs protruding into the flow channel may be integrally formed on the screw 2 or be inserted into the screw flights as a separate component. Another possibility is the integral formation of ribs, for example, as an inner screw, on the inner wall of the housing 1. The housing 1 can be fabricated from two half shells. It is also possible however to introduce the screw 2 into a tube housing, for example by means of a screwing motion.

The flanks of the thread become increasingly thinner outwardly. A particularly efficient heat output is thus achieved, since the quantity of heat to be transported is smaller, the greater is the distance from the center of the screw 2.

The greatest energy transfer to the fluid takes place in the vicinity of the screw core, since this is where the temperature differences are greatest. This is counterbalanced in part since the medium travels an accordingly further path in the outer diameter region and thus comes into contact with a greater heat exchanger area.

In addition, the described ribs may also lead to good mixing of the medium, and therefore the medium can be heated through uniformly.

The tube housing 1 by contrast is to be a poorer heat conductor and can therefore be produced from plastic or for example also from steel. To improve the heat insulation, the tube housing 1 can be formed with two or more shells, and for example an insulating gap can be provided between the shells, which is filled with gas or an insulating material. In particular, the tube housing may comprise a layer of foamed plastic.

At its two ends, the tube housing 1 is closed by a cover 8. The two covers 8 have an opening, which can be used for electrical connections of the heating elements 6. The contact plate or contact plates 7 can protrude from the tube housing 1 or the cover 8. The connection of the heat resistors can also be arranged within the tube housing 1, however.

The tube housing 1 can also be formed by a sleeve that has a base. For example, two sleeves of this type can be slid over opposite ends of the screw 2 in order to form the tube housing 1. Even with such sleeves, the heating device may be formed with a large length or high heating capacity as required by joining together a plurality of sub-screws and thus extending the flow channel. In this case, a tube portion can be arranged between the two sleeves in order to extend the tube housing 1 accordingly.

While exemplary embodiments have been disclosed hereinabove, the present invention is not limited to the disclosed embodiments. Instead, this application is intended to cover any variations, uses, or adaptations of this disclosure using its general principles. Further, this application is intended to cover such departures from the present disclosure as come within known or customary practice in the art to which this invention pertains and which fall within the limits of the appended claims.

What is claimed is:

1. An electric heating device for heating fluids, comprising:
    at least one heating resistor;
    a screw, which defines a helical flow channel; and
    a tube housing, which surrounds the screw;
    wherein the heating resistor is a ceramic PTC element and is part of an assembly including a frame and a contact plate, the PTC element being held by the frame and the frame being fastened to the contact plate, the screw having a cavity with a strip-shaped cross-section complementary to the assembly and the assembly being arranged in the cavity.

2. The heating device according to claim 1, wherein the screw is made of metal.

3. The heating device according to claim 1, wherein the tube housing is made of plastic.

4. The heating device according to claim 1, wherein the at least one heating resistor comprises multiple PTC elements and the frame has compartments, each PTC element being arranged in a respective one of the compartments.

5. The heating device according to claim 1, wherein the cavity comprises a longitudinal cavity wherein the longitudinal direction of the cavity is in the longitudinal direction of the screw.

6. The heating device according to claim 5, wherein the cavity is arranged in the middle of the screw.

7. The heating device according to claim 5, wherein a rear face of the contact plate faces away from the at least one heating resistor and is electrically insulated from the screw via an insulation layer.

8. The heating device according to claim 5, wherein one side of the at least one heating resistor is electrically contacted by the screw and the other side of the at least one heating resistor is electrically contacted by the contact plate.

9. The heating device according to claim 8, wherein a rear face of the contact plate which faces away from the at least one heating resistor is electrically insulated from the screw via an insulation layer.

10. The heating device according to claim 1, wherein the helical flow channel is delimited on a radially inner side by an inwardly rounded wall.

11. The heating device according to claim 1, wherein the tube housing is closed at each of its ends by a cover.

12. The heating device according to claim 1, wherein the screw has a roughened surface.

13. The heating device according to claim 1, wherein the screw carries heat output elements arranged in the flow channel.

14. The heating device according to claim 1, wherein the screw has a thread with flanks that have a thickness that decreases in a radially outward direction.

15. The electric heating device according to claim 1, wherein the frame holds the heating resistor in a clamped manner.

16. The electric heating device according to claim 1, wherein the helical flow channel is delimited on a radially inner side by an inwardly rounded wall.

17. The electric heating device according to claim 16, wherein the screw has flanks which have a thickness that decreases in a radially outward direction.

18. The electric heating device according to claim 1, further comprising a spring that presses the heating resistor or the contact plate against an interior wall of the core.

19. An electric heating device, comprising:
   a tubular housing;
   a screw which is arranged in the housing such that a helical flow channel for a fluid is provided in the housing;
   a frame having at least one electrical heating resistor arranged inside a core of the screw; and
   a contact plate to which the frame is fastened;
   wherein the screw has flanks which have a thickness that decreases in a radially outward direction, further wherein the helical flow channel is delimited on a radially inner side by an inwardly rounded wall.

20. The electric heating device of claim 19, wherein a rear face of the contact plate faces away from the heating resistor and is electrically insulated with respect to the screw by an insulation layer.

21. The electric heating device of claim 19, wherein the frame holds the at least one heating resistor in a clamped manner.

22. The electric heating device according to claim 19, wherein the frame has a compartment to hold the at least one heating resistor.

23. The electric heating device according to claim 19, wherein the heating resistor comprises a PTC element.

* * * * *